Dec. 8, 1953  W. S. SALISBURY  2,661,558
LOCKING SEAL FOR VEHICLE LICENSE PLATES
Filed May 22, 1950
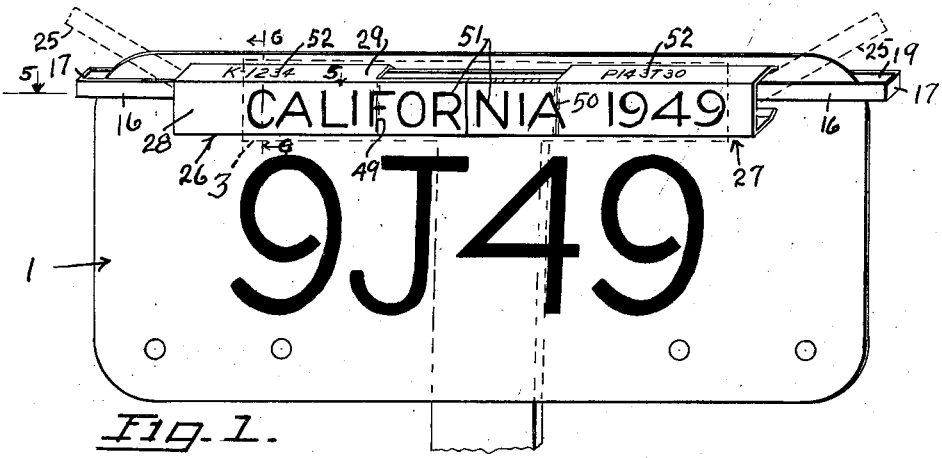
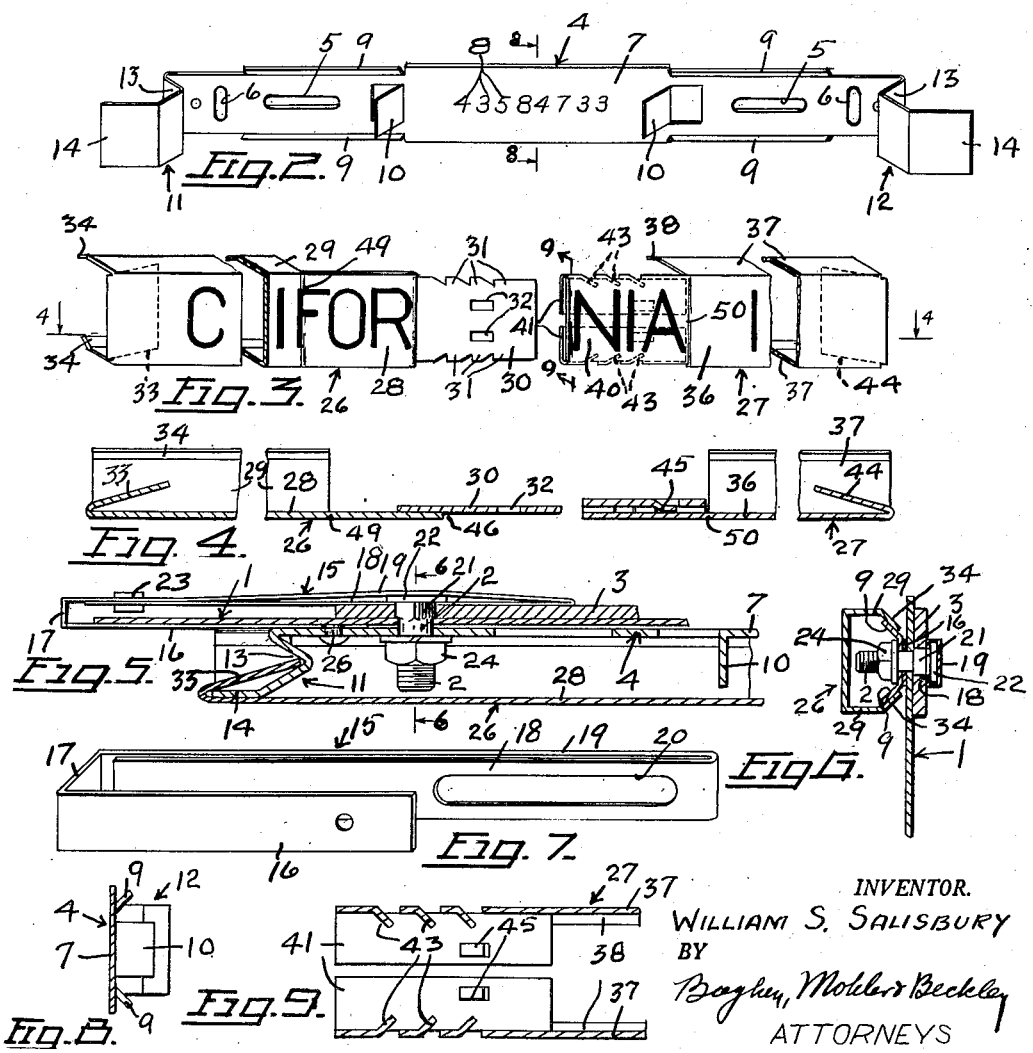
INVENTOR.
WILLIAM S. SALISBURY
BY
*Bagley, Mohler & Beckley*
ATTORNEYS Patented Dec. 8, 1953

2,661,558

UNITED STATES PATENT OFFICE 2,661,558

LOCKING SEAL FOR VEHICLE LICENSE PLATES

William S. Salisbury, San Francisco, Calif.

Application May 22, 1950, Serial No. 163,490

4 Claims. (Cl. 40—125)

This invention relates to a locking seal for vehicle license plates, and has for one of its objects the provision of a breakable sealing member adapted to be placed over the bolts that hold a vehicle license plate onto said vehicle for more securely and effectively preventing unauthorized removal of such plate than heretofore.

Another object of the invention is the provision of a locking seal for a vehicle license plate that requires breaking of said seal in order to remove it, and which seal is easily and quickly applied and is rugged, pleasing in appearance, and is adapted to carry important and vital information thereon relative to ownership of the vehicle. Furthermore, said seal is of a character that may be replaced annually or as desired, by authorized persons, without injury to the license plate.

Other objects and advantages will appear in the description and drawings.

In the drawings,

Fig. 1 is a front perspective view of an automobile license plate having a sealing means thereon constructed in accordance with this invention.

Fig. 2 is a perspective view of the portion of the sealing member to be bolted to the vehicle and to which the final sealing element is attached.

Fig. 3 is a perspective view of two of the portions of the final sealing element separated to show their structure, and partially broken in length to accommodate the view to the sheet.

Fig. 4 is a sectional view taken along the line 4—4 of Fig. 3.

Fig. 5 is an enlarged fragmentary horizontal sectional view taken through one end of the license plate assembly including the sealing means, along line 5—5 of Fig. 1.

Fig. 6 is a reduced size sectoinal view taken along the line 6—6 of Figs. 1 and 5.

Fig. 7 is a perspective view of one of the elements of the sealing device separate from the others.

Fig. 8 is a slightly enlarged sectional view taken along line 8—8 of Fig. 2.

Fig. 9 is an enlarged fragmentary sectional view taken substantially along line 9—9 of Fig. 3.

In detail, the construction as illustrated in the drawings, comprises a vehicle license plate, generally designated 1 (Figs. 1, 5, 6) which plate is adapted to be secured by a pair of horizontally spaced bolts 2 to the horizontally extending conventional cross head 3 on a bracket that, in turn, is secured to the vehicle. Only the left hand bolt 2 of the pair is shown (Fig. 5) it being understood that the right hand bolt is the same. Inasmuch as the parts directly engaged by bolts 2 are the same, only the parts at the left hand side (looking at the drawing) are shown in enlarged detail in Fig. 5.

An elongated horizontal metal strip 4 (Fig. 2) is the portion of the device to which the final sealing elements are secured, and this strip is adapted to extend the full horizontal length of the license plate and slightly beyond at its ends, said strip being formed with horizontally elongated apertures 5 and vertically elongated apertures 6 (Fig. 2) adjacent to its opposite ends for passing bolts 2. The several different apertures are to adapt the strip to license plates having differently positioned bolt openings.

The central portion 7 of the strip 4 is preferably flat and may bear members or symbols 8 (Fig. 2) stamped or etched therein for identification purposes, and the upper and lower marginal portions of said strip extending straight from the opposite ends of central portion 7 are bent to the same side of the strip to provide flanges 9 that preferably extend past the apertures 5, but which terminate at points along the straight length of strip 4.

At points about even with the junctures between the unflanged central portion 7 of strip 4 and the flanged portions, said strip is stamped out to provide ears 10 projecting to the same side of said strip as the flanges 9.

The opposite end portions 11, 12 of strip 4 are also bent at points spaced oppositely outwardly of apertures 6 to project from the same side of strip 4 as flanges 9 and ears 10. These end portions 11, 12 are bent transversely of the longitudinal axis of said strip to provide laterally oppositely outwardly opening recesses 13 (Figs. 2, 5) respectively having slanted sides that meet at the bottom of each recess. The outermost end part 14 of each portion 11, 12 is preferably parallel with the straight length of strip 4 that extends between said end portions 11, 12, and said parts 14 extend oppositely outwardly from each other.

The flat side of the straight length of strip 4 that is opposite the flanges 9 and ears 10 is adapted to lie against the number bearing face of the license plate 1, which would be the rearwardly directed face of said plate when it is on the rear end of the vehicle, or the forwardly directed face when it is on the front end.

The apertures 6, or 7 will register with the conventional bolt openings that are at or adjacent to the opposite upper corners of said license plate.

In Fig. 7 is shown a horizontally disposed bolt protecting strap 15 that is to be used at each end of the strip 4 when the strip 4 and license plate are bolted to the cross head 3 of the plate mounting bracket.

Strap 15 is formed at one end with a return bend 16 that is spaced by the end bend 17 from the remainder. The other end portion 18 of said strap is bent to the same side as the return bend, but in close overlying relationship to the central portion 19 of said strap, and said portion 18 extends below return bend portion 16 to substantially the end bend 17. The said return bend portion 16 preferably terminates at a point substantially short of the juncture between central portion 19 and the end portion 18, and the part of said end portion 18 that extends from below the return bend 16 to said juncture is formed with a horizontally elongated slot 20 that is adapted to pass the square shank 21 (Fig. 5) of bolt 2, it being understood that said bolt is preferably a flat or round headed carriage bolt. When the square shank 21 is in the slot 20, the bolt will be held against turning; and the square shank is also held in the head 3.

Inasmuch as there is a strap 15 for each of the two bolts 2, and as such straps are identical, it will be necessary to describe only one in detail, insofar as its installation is concerned, it being understood that the description applies to both.

In assembling the license plate 1, strip 4, straps 15, and bolts 2, the first step is to insert the bolt 2 through slot 20 so that the head 22 of the bolt is between central portion 19 and end portion 18 of each strap. This may be done either by forming the bends in the strap after the bolt is inserted, or by springing the portion 18 away from central portion 19 a sufficient distance to enable the bolt to be inserted through said slot.

After the bolt head 22 is between portions 18, 19 the end of the portion 18 may be riveted to portion 19 at 23 (Fig. 5).

The bolt 2 may thus be inserted through the cross head 3 of the plate supporting bracket and through the bolt opening in the license plate and through the aperture 6 in strip 4 so that the threaded end of bolt 2 will project from the strip 4 at the same side thereof as flanges 9. The nut 24 may then be placed on the bolt and the latter tightened.

The elongated slots 20 in strap 15 enable the straps to extend over the end edges of license plates of different lengths. In Fig. 1 the said straps 15 are indicated in dotted line positions 25 before swinging down to extend over the end edges of the plate 1. Once the straps are swung down to the full line position shown in Fig. 1, they may, if desired, be slipped toward each other until the bends 17 engage the end edges of the plate, and when in this latter position, the end portions 16 of said straps may be riveted to the strip 4 by rivets 26 (Fig. 5).

After the above steps are finished, it will be seen that the heads 22 of the bolts 2 cannot be tampered with because they are concealed between the portions 18, 19 of the straps 15. It will also be seen that the end portions 11, 12 of the strap 4 project past the nuts 22 and the ends of bolts 2 that carry the latter. The remaining structure is to conceal the nuts so that they cannot be removed.

The elements generally designated 26, 27 provide the final sealing elements for concealing the nuts 24.

The element 26 comprises a horizontally elongated rearwardly opening channel member, the term "rearwardly" being used with reference to the position of the license plate, the open side of the channel member being directed toward said plate. Channel member 26 is the left hand member of the two, looking at Figs. 1, 3 and 4, and the bottom 28 thereof extends to the right beyond the terminating ends of the upper and lower side walls 29 of said member, and the right end portion 30 of the projecting end of said portion is preferably offset rearwardly (to the same side as side walls 29) a distance the thickness of the bottom wall 28 (Fig. 4).

The upper and lower edges of the offset extension 30 are formed with corresponding teeth 31 so formed that their edges that are substantially normal to the longitudinal axis of the channel member face toward the channel portion and away from the terminating outer end edge of the extension 30. Said extension 30 is also preferably formed with a pair of openings 32 spaced one above the other.

At the end of the channel member 26 opposite extension 30, the bottom 28 is extended as at 33 beyond the ends of the walls 29 and is bent back to a position between said walls (Figs. 3, 4) and extending at an angle to the bottom wall 29.

The marginal portions 34 of the upper and lower sides 29 of the channel member 26 along their free longitudinally extending edges are bent inwardly toward each other to correspond to the inclination of the flanges 9 on strip 4. The spacing between marginal portions 34 is such that the flanges 9 will telescopically and slidably engage the inner sides of the marginal portions 34 upon endwise movement of the channel member 26 over strip 4 from the left hand end of the latter (as seen in Fig. 2) and with the extension 30 leading. When the said member 26 is so moved over the end of strip 4, the free end of extension 33 on said member will move into recess 13 formed in the end portion 11 of said strip 4 (Fig. 5). The width of the side walls 29 is such that the bottom wall 28 of channel member 26 will extend over the bolt 2 and nut 24 as well as the ear 10 on said strip 4.

The right hand channel member 27 has a bottom wall 36 and upper and lower side walls 37, the latter being formed with inwardly inclined marginal portions 38 the same as marginal portions 34 on member 26, and which marginal portions are adapted to slidably receive the flanges 9 at the right hand end of strip 4 therebetween in the same manner as the marginal portions 34 receive the flanges 9 at the left hand end of strip 4.

The bottom wall 36 is extended as at 40 toward the member 26 beyond the terminating ends of walls 37, but instead of the side walls 37 being removed, they are bent to form sections 41 overlying the rear side of extension 40, as best seen in Fig. 3, and the bends along the upper and lower edges of said extension 40 are stamped out to provide inwardly projecting teeth 43 spaced apart the same distances as ratchet teeth 31 in direction longitudinally of the member 27.

The right hand end portion 44 of bottom wall 36 forms an extension that is bent back to between walls 37 in the same manner as the extension 33 of member 26, and said extension 44 is adapted to enter recess 13 at the right hand end of the strip 4 when the member 27 is slipped onto said member from its right hand end. Once the extension 33 is in recess 13, it cannot be bent out because the side of said recess that adjoins the strip 4 prevents such movement. It is therefore impossible for anyone to gain access to nuts 24 from the outer ends of the device.

Each of the sections 41 is partially stamped out to provide projections 45 that project toward the extension 40 of bottom wall 36, and said projections are spaced to correspond to the spacing between openings 32 in the extension 30 of the bottom wall of member 26.

In operation, the members 26, 27 are slipped lengthwise over the strip 4 from opposite ends of the latter, and toward each other with the extensions 30, 40 leading, and the extension 30 will enter the space between sections 41 and extension 40 to telescopically fit therebetween. The ratchet teeth 31 will be forced past teeth 43 to interlocking relationship and projections 45 will slip into openings 32 when the end edge of the bottom extension 40 engages the shoulder 46 (Fig. 4) at the juncture between the offset extension 40 and bottom wall 28.

The teeth 43 will spring apart along the upper and lower edges of the extension 40 to permit teeth 31 to slide therepast, and when the two members 26, 27 are so moved together they cannot be removed from the strip 4 without so mutilating them as to render such attempted removal obvious to the observer. Also the outer (forward) faces of the bottom walls 28, 36, 40 will be coplanar, and will provide a surface for carrying the name 51 of the state in which the license is issued, or the date of the license or any other suitable symbols, if desired.

In order to facilitate the removal of the channel members 26, 27 by authorized persons, they may respectively be transversely scored or otherwise weakened along lines 49, 50 at the junctures between the bottom wall extensions and the channel portions, which lines are at opposite ends of the toothed interlocked portions or extensions.

Thus an authorized person could readily break the toothed interlocked sections out, enabling the channel members to be slipped off, but such a removal would require a tool of some sort, and the removal would be obvious.

The side walls 29 or 37 or both or the bottom walls of the channel members, provide spaces for official identifying numerals or symbols 57 (Fig. 1).

The structure as described is intended to secure the license plate to a vehicle in such a manner that its removal cannot be effected without breaking a clearly visible seal, thereby making it necessary for the operator of the vehicle to take steps to procure a new seal from the authorities in order to avoid a possible fine or investigation or both.

No unusual tools are required to position the seal on the vehicle nor are any unusual tools required to remove the seal, yet the latter will remain securely connected with the license plate until purposely removed.

The end portions 14 on strip 1 preferably engage the bottom walls 28, 36 of members 26, 27 when the latter are secured to said strip, and the ears 10 that are at the ends of the central portion 7 of strip 4 effectively prevent access to nuts 24 from the inner ends of the channel members.

It is also obvious from the foregoing structure that the seal is adapted to cover and to protect the identifying members 8 on the strip 4, which may be a more permanent feature in the licensing system than the final sealing elements 26, 27. The latter may be changed annually, but the former may be relatively permanent, or changed only when the license plates themselves are changed, such as every second or third year. In other words, the present invention provides a more reliable checking system than heretofore.

Having thus described this invention, what I claim and desire to secure by Letters Patent is:

1. Sealing means for the horizontally spaced headed bolts and nuts that are positioned for securing a vehicle license plate to its supporting bracket comprising; a strip apertured for said bolts and adapted to extend across the outer face of said plate for securement against said face by said nuts, and elements slidable on said strip from opposite ends thereof to positions extending over the bolt apertures in said strip and adapted to extend over said bolts and nuts, interlocking complementarily formed projections and recesses respectively formed on the adjacent ends of said elements and positioned for movement to interlocking interengaging relationship when said elements are moved together from said opposite ends for locking said elements together, said elements including laterally opening channel portions disposed with their open sides facing said strip, the upper and lower sides of said portions extending across the longitudinally extending edges of said strip along their free edges, and end extensions on said strip projecting between said upper and lower sides at points oppositely outwardly of the apertures for said bolts to prevent access to said nuts from points at the ends of said strip when said bolts are in said apertures with the nuts thereon.

2. Sealing means for the horizontally spaced headed bolts and nuts that are positioned for securing a vehicle license plate to its supporting bracket comprising; a strip apertured for said bolts and adapted to extend across the outer face of said plate for securement against said face by said nuts, and elements slidable on said strip from opposite ends thereof to positions extending over the bolt apertures in said strip and adapted to extend over said bolts and nuts, interlocking complementarily formed projections and recesses respectively formed on the adjacent ends of said elements and positioned for movement to interlocking interengaging relationship when said elements are moved together from said opposite ends for locking said elements together, said elements including laterally opening channel portions disposed with their open sides facing said strip, the upper and lower sides of said portions extending across the longitudinally extending edges of said strip along their free edges, and end extensions on said strip projecting between said upper and lower sides at points oppositely outwardly of the apertures for said bolts to prevent access to said nuts from points at the ends of said strip when said bolts are in said apertures with the nuts thereon, said strip being formed with ears extending between said sides and spaced inwardly of said end extensions and the bolt apertures for preventing access to said nuts from points between said bolts.

3. A license plate seal for the horizontally spaced, headed bolts and nuts that secure the license plate to its supporting bracket, comprising; a pair of laterally opening channel elements in longitudinal alignment respectively adapted to extend over said bolts with the latter between the upper and lower sides of said elements and with the bottoms of said elements extending over said bolts outwardly thereof, a strip apertured for receiving said bolts therethrough and adapted to be secured against said plate by said bolts, complementarily formed guide and slide means on said strip and elements respectively for slidably securing said elements to said strip for sliding of said elements to positions over said bolts, and interengaging interlocking means on the adjacent ends of said elements positioned for movement into interlocking relationship when said elements are moved together, extensions respectively on said strip and said elements, movable into interengaging relationship at the opposite outer ends of said channel members.

4. In combination with a license plate, its supporting bracket, and a pair of horizontally spaced headed bolts extending through said plate and said bracket having nuts therein securing said plate and bracket together between the heads and nuts on said bolts respectively; a strip extending across the outer side of said plate relative to said bracket through which said bolts extend with said nuts against the outer side of said strip securing the latter against said plate, laterally opening channel elements positioned on said strip with the sides and bottoms of said elements enclosing said nuts, interengaging means on said strip with the sides and bottoms of said elements enclosing said nuts, interengaging means on said strip and said elements slidably securing them together for movement of said elements toward each other from positions at the ends of said strip outwardly of said nuts to said nut-enclosing positions, and interlocking means on the adjacent ends of said elements movable to interlocking relationship upon said movement of said elements to said nut enclosing position for locking said elements together against separation, extensions on the ends of said strip extending between the upper and lower sides of said elements for preventing access to said nuts from the opposite outer sides of said pair of bolts, and head-enclosing members secured to said bolts extending over the heads of said bolts and into the space between said sides of said elements for preventing access to the heads of said bolts.

WILLIAM S. SALISBURY.

References Cited in the file of this patent

UNITED STATES PATENTS

| Number    | Name        | Date           |
|-----------|-------------|----------------|
| 1,081,940 | Davis       | Dec. 16, 1913  |
| 1,354,165 | Brooks      | Sept. 28, 1920 |
| 1,612,420 | Davis       | Dec. 28, 1926  |
| 1,893,537 | Cruze       | Jan. 10, 1933  |
| 1,928,527 | Fortinberry | Sept. 26, 1933 |
| 1,944,195 | Salisbury   | Jan. 23, 1934  |
| 1,950,803 | Lewis       | Mar. 13, 1934  |